United States Patent
Upadhyay et al.

(10) Patent No.: US 12,292,801 B1
(45) Date of Patent: May 6, 2025

(54) SCHEDULING BACKUPS ON A PRIMARY DATABASE IN A HIGH-AVAILABILITY CONFIGURATION

(71) Applicant: Dell Products L.P., Round Rock, TX (US)

(72) Inventors: Navneet Upadhyay, Greater Noida (IN); Rejith Mohan M, Bengaluru (IN); Xiaoliang Zhu, Shanghai (CN); Shaofeng Chang, Shanghai (CN); Ban Wang, Burlington (CA); Pati Mohan, Bangalore (IN); Amith Ramachandran, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/496,210

(22) Filed: Oct. 27, 2023

(51) Int. Cl.
G06F 11/14 (2006.01)
(52) U.S. Cl.
CPC ...... G06F 11/1461 (2013.01); G06F 11/1451 (2013.01); G06F 2201/80 (2013.01)
(58) Field of Classification Search
CPC ............. G06F 11/1461; G06F 11/1451; G06F 2201/80
See application file for complete search history.

(56) References Cited

U.S. PATENT DOCUMENTS

| | | | |
|---|---|---|---|
| 7,788,456 B1* | 8/2010 | Park | G06F 11/1448 711/161 |
| 8,140,791 B1* | 3/2012 | Greene | G06F 11/1464 711/168 |
| 9,311,330 B1* | 4/2016 | Chockalingam | G06F 11/1458 |
| 9,934,107 B1* | 4/2018 | Chikkanayakanahally | G06F 11/1456 |
| 2012/0179655 A1* | 7/2012 | Beatty | G06F 11/1469 707/646 |
| 2017/0039106 A1* | 2/2017 | Wang | G06F 11/1469 |
| 2017/0103000 A1* | 4/2017 | Iyengar | G06F 11/1451 |
| 2019/0079928 A1* | 3/2019 | Kumar | G06Q 10/107 |
| 2021/0182153 A1* | 6/2021 | Yadav | G06F 11/1461 |

OTHER PUBLICATIONS

"Oracle® Data Guard, Concepts and Administration." (Feb. 2021), Oracle, 19C E96244-04 (438 pages).

* cited by examiner

*Primary Examiner* — William Spieler
(74) *Attorney, Agent, or Firm* — Chamberlain, Hrdlicka, White, Williams & Aughtry; Aly Z. Dossa

(57) ABSTRACT

In general, embodiments relate to a method for backing up databases, the method includes receiving a backup request, wherein the backup request specifies a role of primary and an asset group identifier for an asset group, identifying, based on the backup request, a database in the asset group, and issuing the backup request for the database.

11 Claims, 11 Drawing Sheets

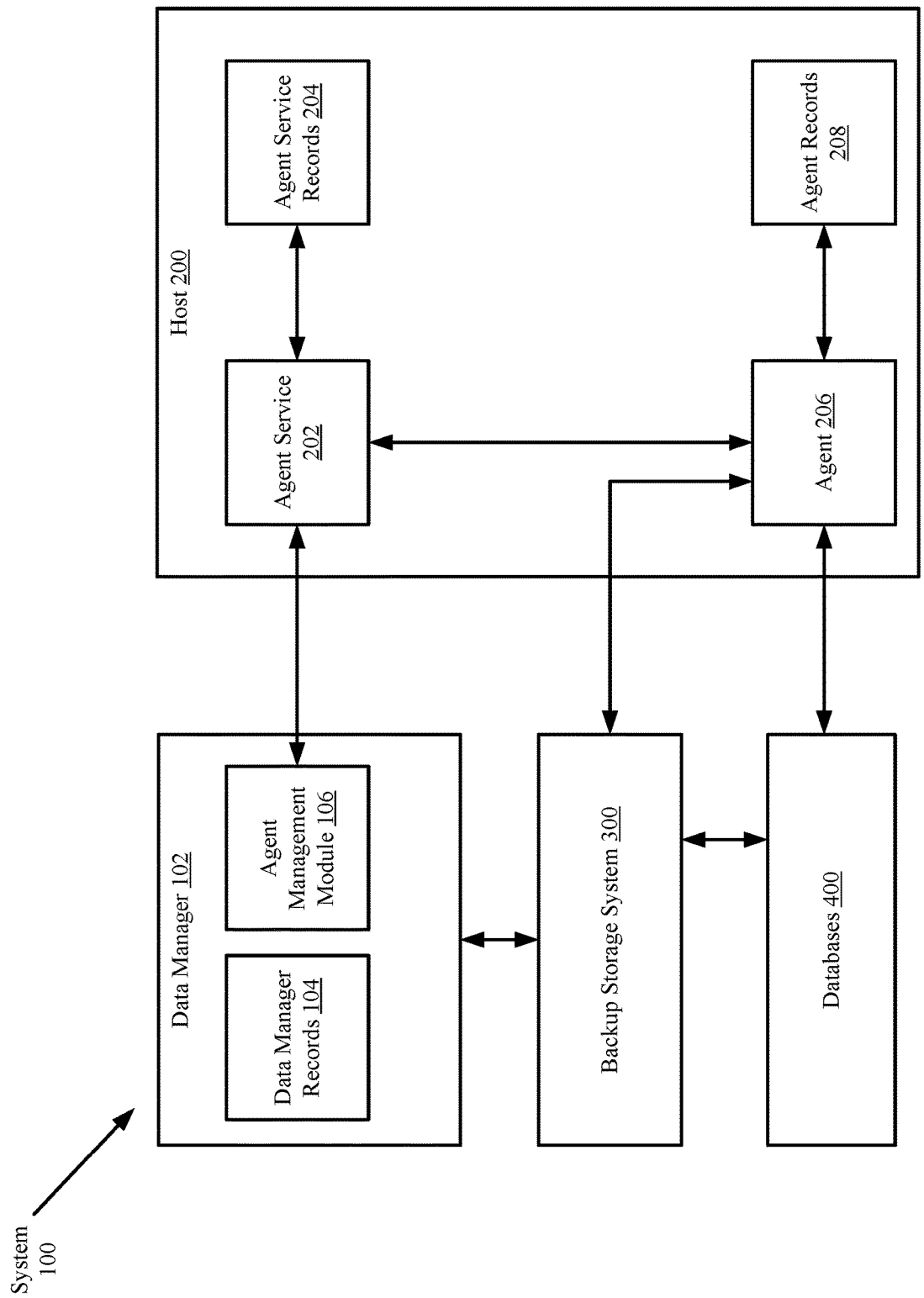
FIG. 1.1

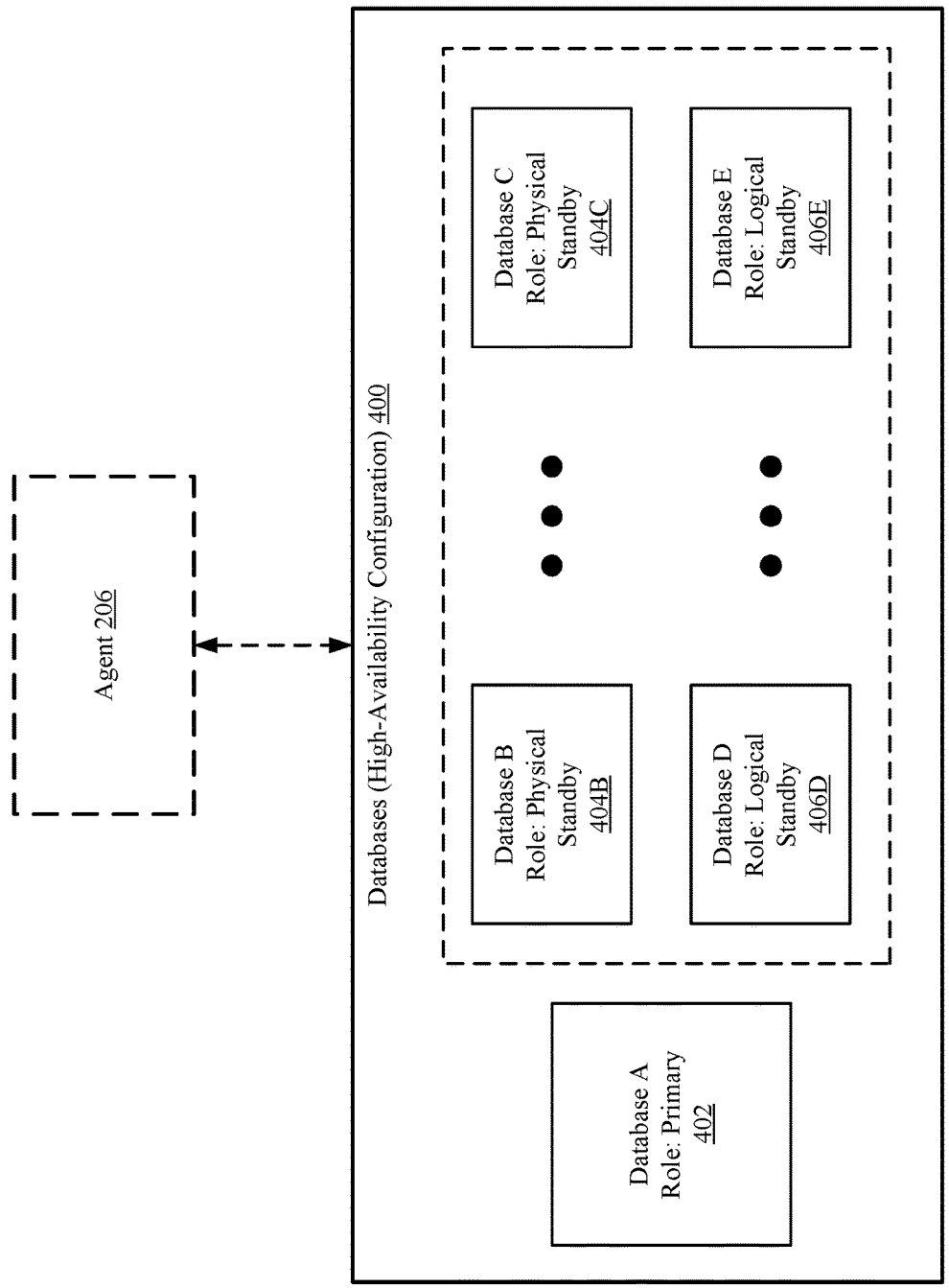
FIG. 1.2

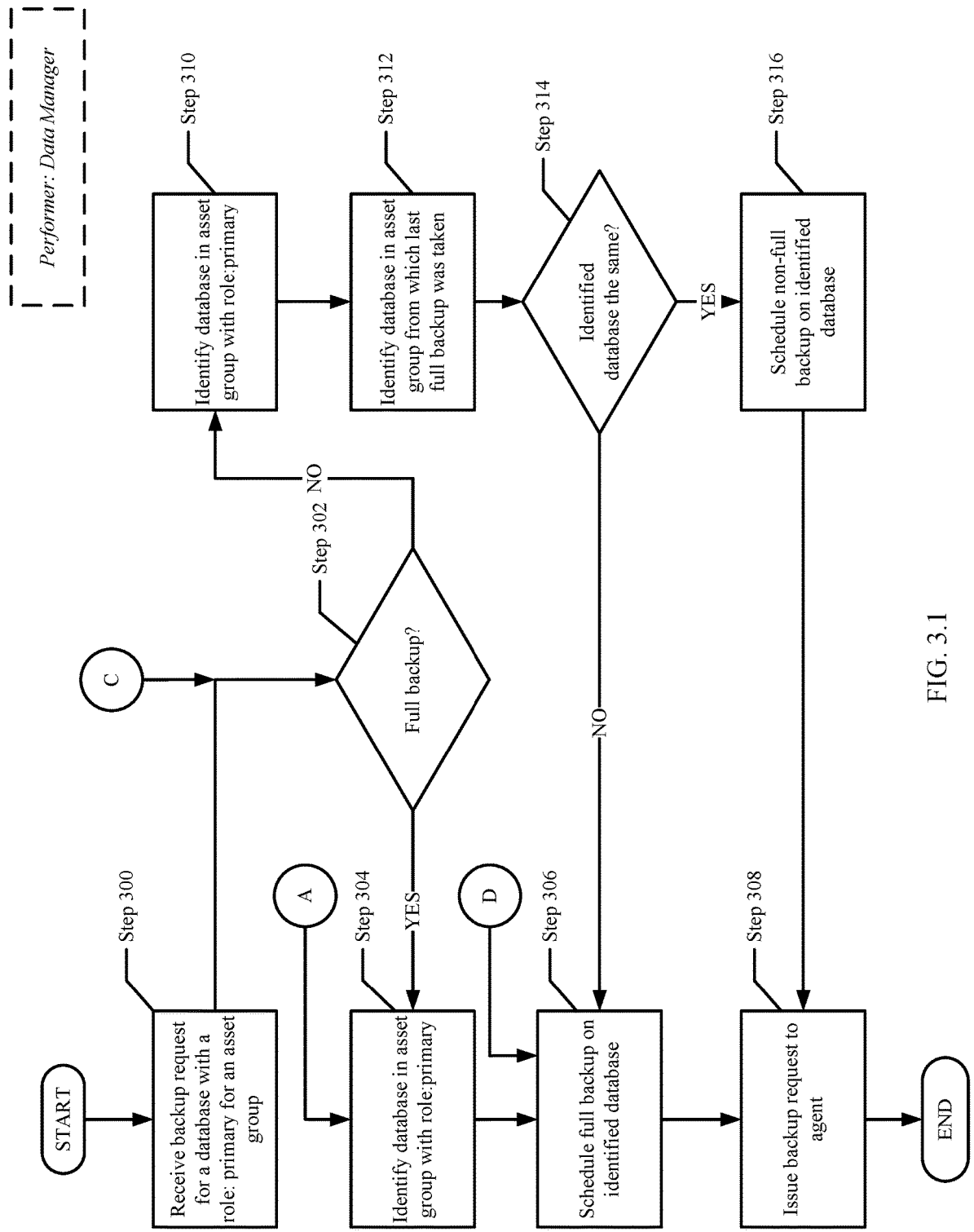
FIG. 3.1

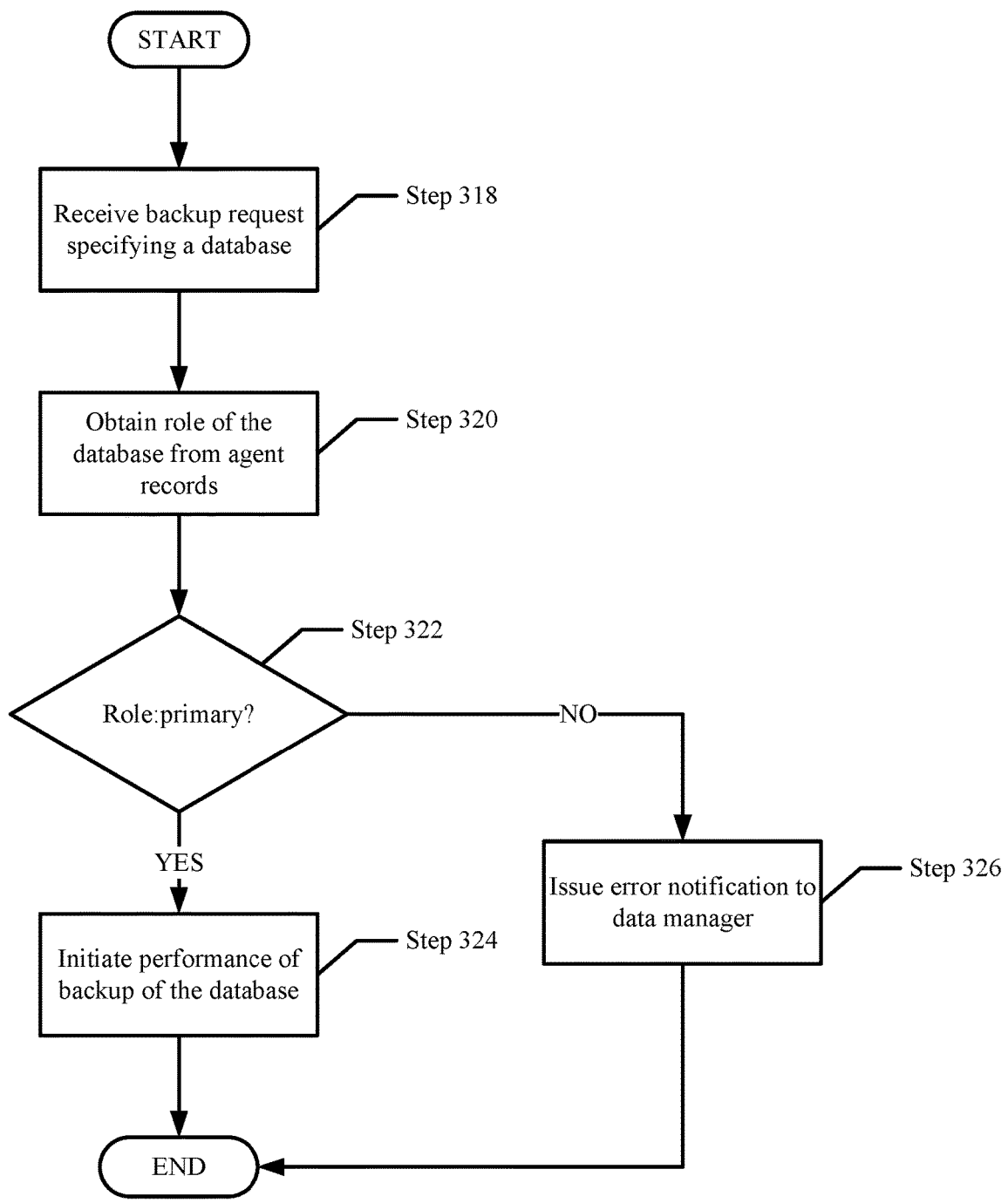
FIG. 3.2

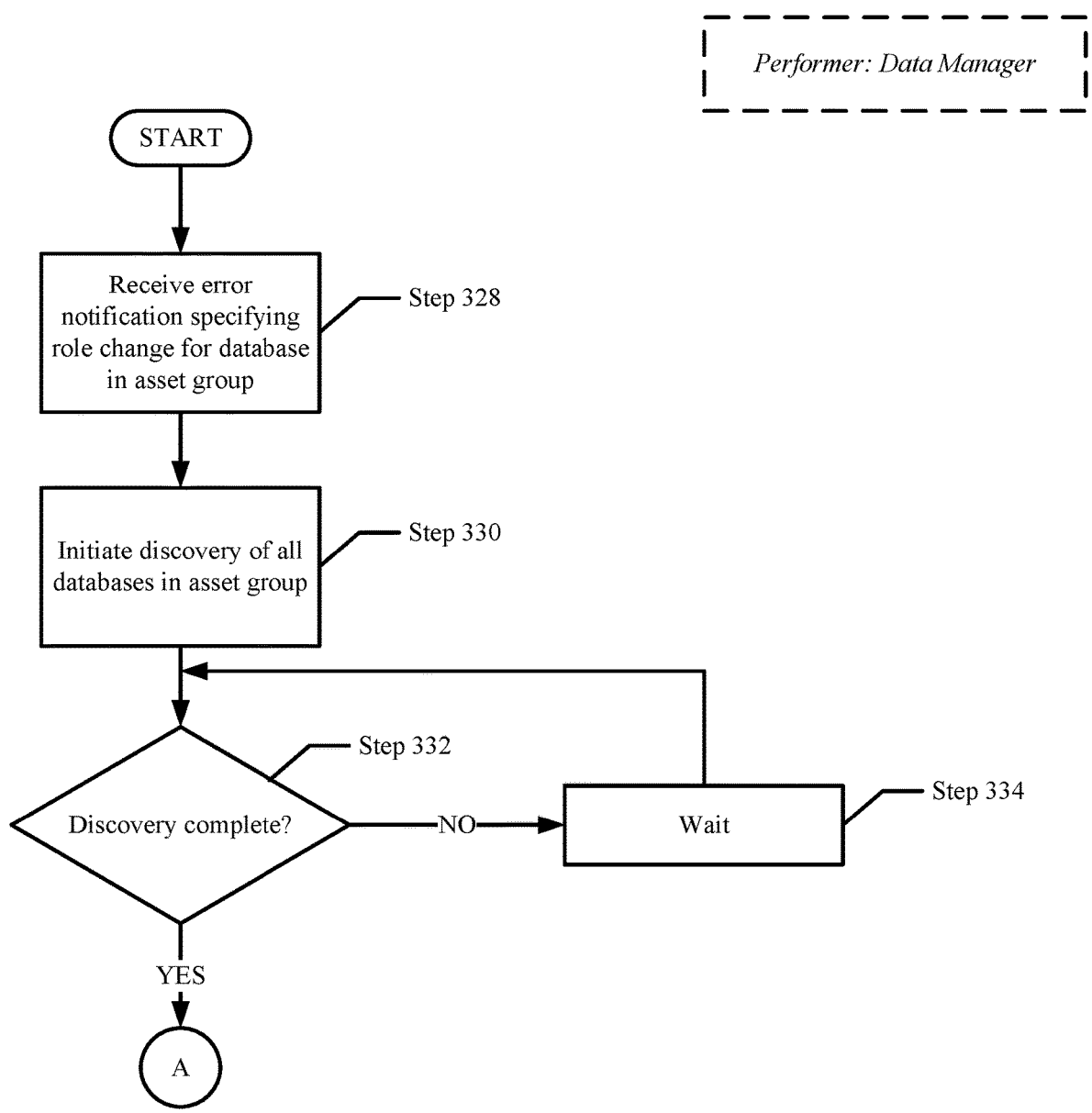
FIG. 3.3

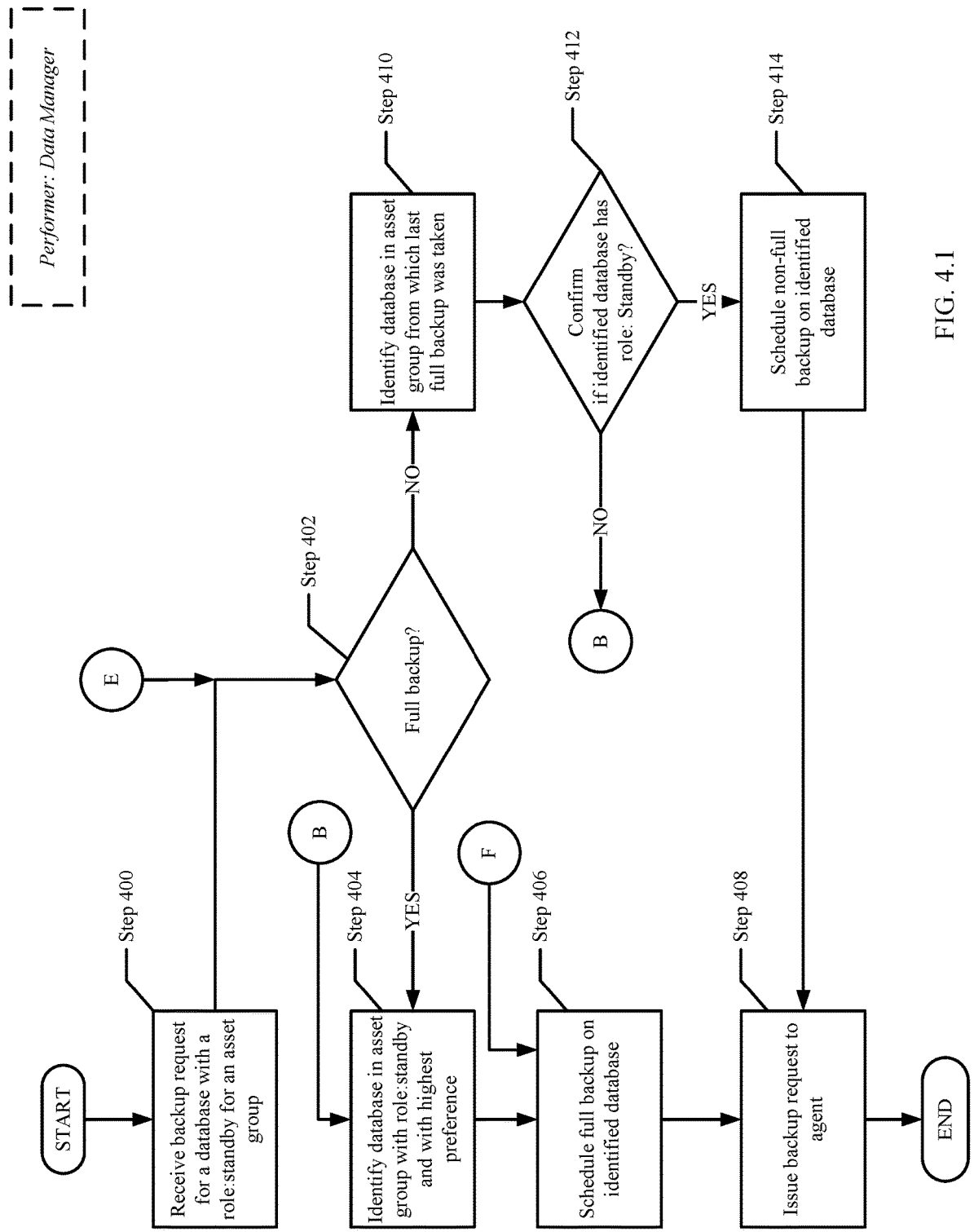
FIG. 4.1

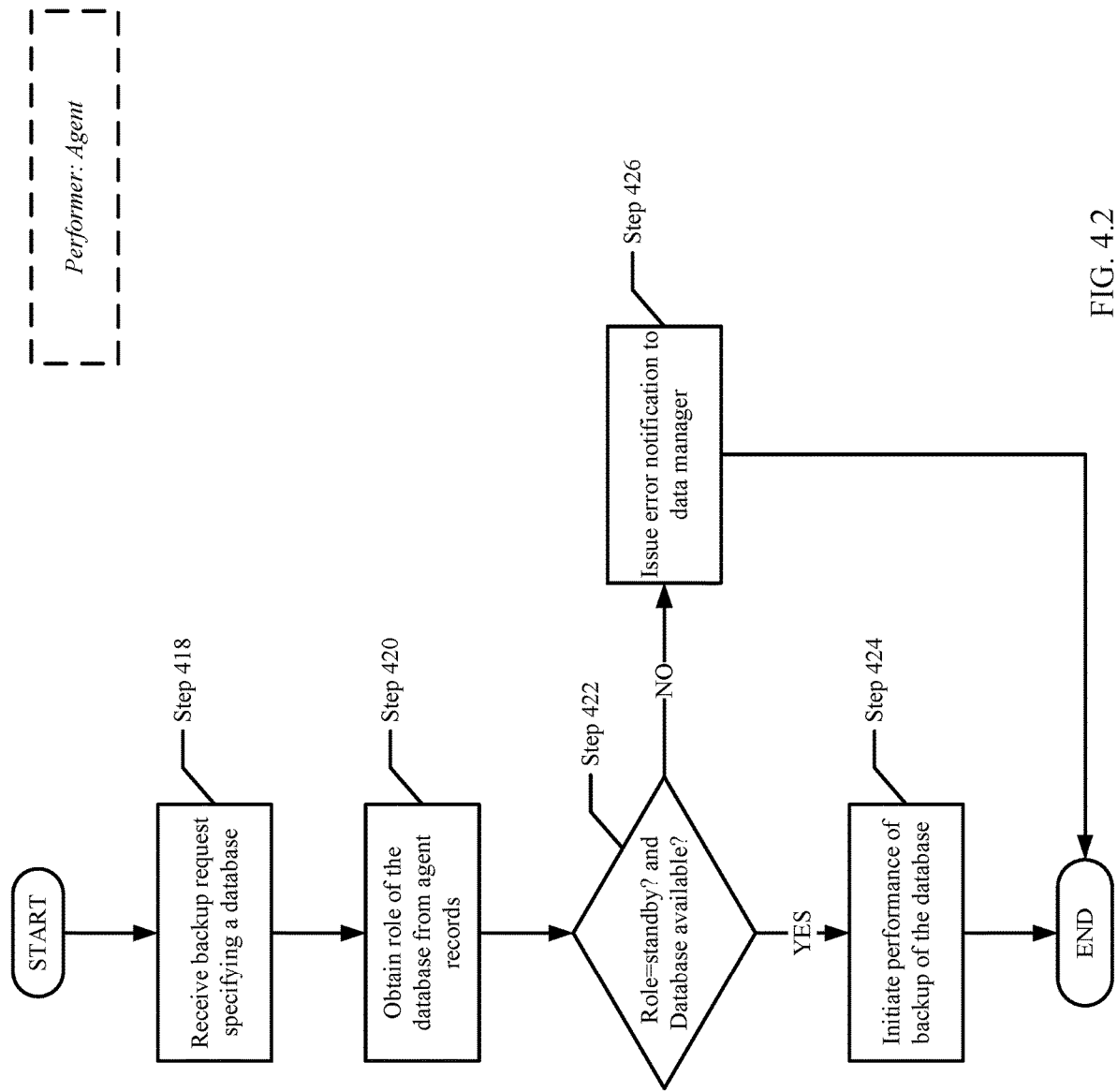
FIG. 4.2

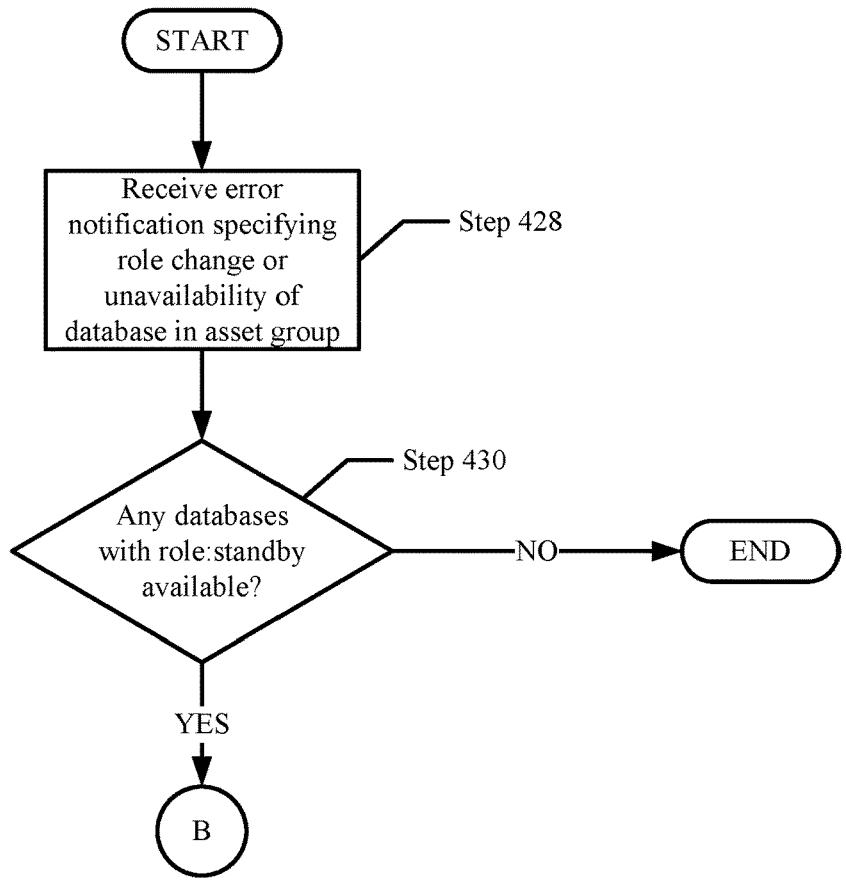
FIG. 4.3

SCHEDULING BACKUPS ON A PRIMARY DATABASE IN A HIGH-AVAILABILITY CONFIGURATION

BACKGROUND

Computing devices may include any number of internal components such as processors, memory, and persistent storage. Computing resources associated with (e.g., used by) each of these internal components may be used to generate, store, and backup data. The backing up of data needs to be performed in a manner that minimizes the impact on users of the computing devices.

BRIEF DESCRIPTION OF DRAWINGS

Certain embodiments of the technology will be described with reference to the accompanying drawings. However, the accompanying drawings illustrate only certain aspects or implementations of the technology by way of example and are not meant to limit the scope of the claims.

FIG. 1.1 shows a diagram of a system in accordance with one or more embodiments of the technology.

FIG. 1.2 shows a diagram of a configuration of databases in accordance with one or more embodiments of the technology.

FIGS. 3.1-3.3 show flowcharts of a method for backing up on a database in accordance with one or more embodiments of the technology.

FIGS. 4.1-4.3 shows a flowchart of a method for backing up on a database in accordance with one or more embodiments of the technology.

DETAILED DESCRIPTION

Specific embodiments will now be described with reference to the accompanying figures.

In general, embodiments of the technology relate to backing up assets, where the assets are arranged in a high-availability configuration (see e.g., FIG. 1.2). In the context of this technology, an asset is data or a database that is associated with a file, a folder and/or any other data hierarchy (or structure) (e.g., a volume). Various embodiments relate to determining how and when to back up assets in a manner that efficiently utilizes system resources.

Referring now to FIGS. 3.1-3.3, in one embodiment of the technology, backups are scheduled on an asset of the asset group with a role of primary. In this embodiment, the protection strategy ensures that the asset with the role of primary (as opposed to a specific asset) is always protected. As will be discussed in further detail below, the role associated with an asset may change over time. Thus, an asset may initially have a role of primary and then later transition to a role of standby or go offline (i.e., become unavailable). If the protection strategy is based on a specific asset (e.g., database A) instead of an asset with the role of primary, then there are scenarios in which the asset may be unavailable and, as a result, the asset will not be backed up. However, if the protection strategy is based on backing up the asset with a role of primary, then the asset with the role of primary will always be backed up. Said another way, in a high-availability configuration with multiple assets, at any given time there will be one asset with the role of primary. When a backup on an asset with the role of primary is initiated, a determination is made about which asset currently has the role of primary, and then this identified asset is backed up. This approach enables protection strategies to be based on roles, which inherently accounts for the dynamic nature of the role associations in high-availability configurations.

Referring now to FIGS. 4.1-4.3, in one embodiment of the technology, backups are scheduled an asset of the asset group with a role of standby. In this embodiment, the protection strategy ensures that the asset with the role of standby (as opposed to a specific asset) is always protected. This approach enables protection strategies to be based on roles, which inherently accounts for the dynamic nature of the role associations in high-availability configurations.

Figure 5:
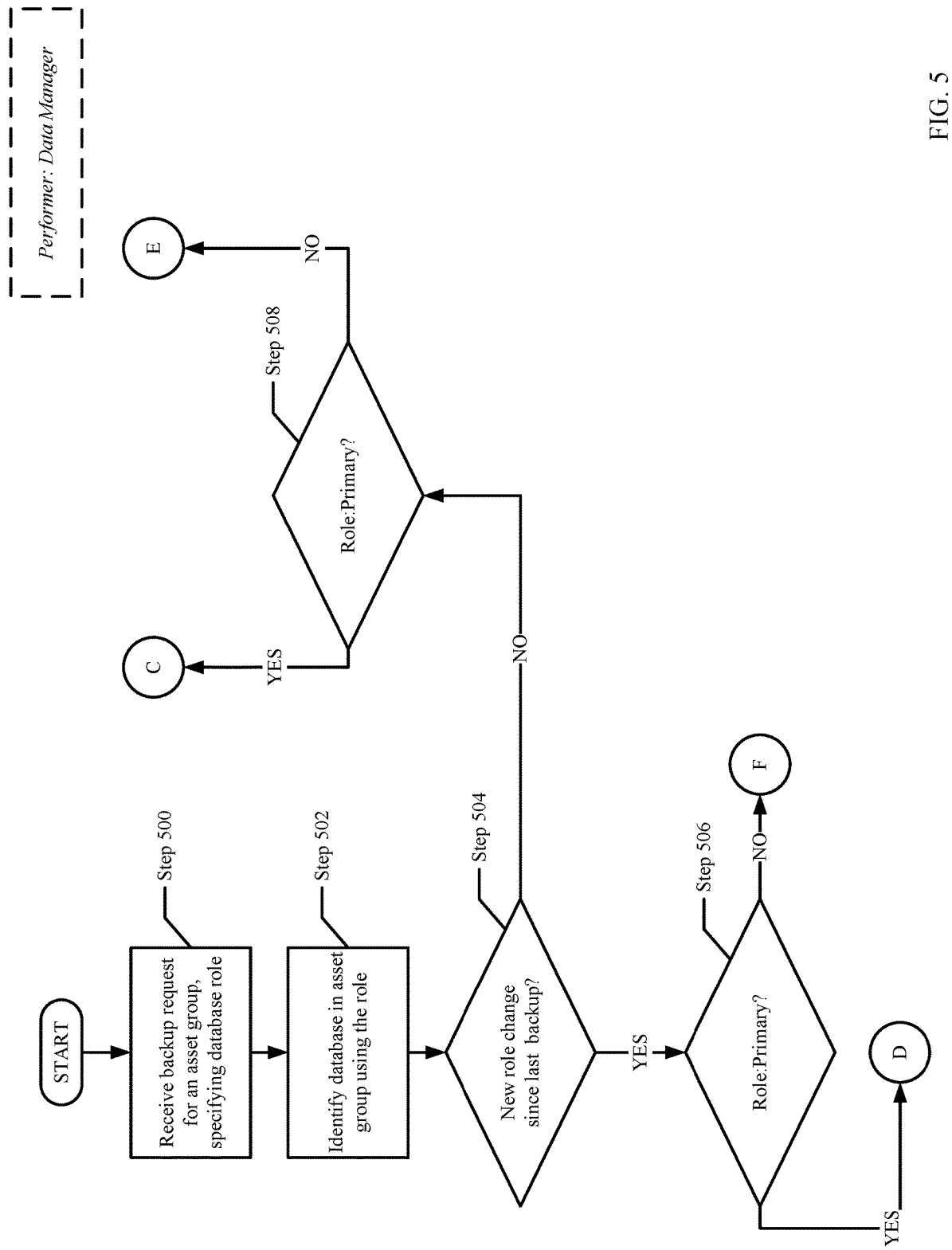
FIG. 5 shows a flowchart of a method for backing up on a database in accordance with one or more embodiments of the technology.

Referring now to FIG. 5, in one embodiment of the technology, if a role change is detected on an asset, then proactive steps may be taken to ensure that a full backup is performed on such assets. More specifically, if an incremental backup is scheduled on an asset in an asset group, and the last backup that was performed for this asset group was not on this asset, then a full backup is performed instead of an incremental backup. By promoting the incremental backup to a full backup, this embodiment eliminates (or substantially eliminates) the resources required to determine what needs to be part of the incremental backup. Said another way, if the last backup for the asset group was not performed on the asset that is now being backed up, then an incremental backup on this asset would be relative to the last backup on this asset (and not relative to the last backup on the asset group) and, as such, would be fairly large. Accordingly, by detecting the role change (as noted above) and then using this detection to force a full backup, the resources that are required to determine what portions of the asset should be included in the incremental backup are not expended.

The above three approaches may be used together or separately, and may be implemented on the systems shown in FIGS. 1-1.2 and 6.

The following describes one or more embodiments of the technology.

FIG. 1.1 shows a diagram of a system in accordance with one or more embodiments described herein. The system includes a data manager (102), one or more hosts (e.g., 200), one or more backup storage systems (e.g., 300), and one or more databases (400). Each of these components is described below.

In one or more embodiments, the components in FIG. 1.1 may operatively connect to one another through a network (e.g., a local area network (LAN), a wide area network (WAN) such as the Internet, a mobile network, etc.). The network may be implemented using any combination of wired and/or wireless connections. Further, the network may encompass various interconnected, network-enabled sub-components (or systems) (e.g., switches, routers, gateways, etc.) that may facilitate communications between the above-mentioned system (100) components. Moreover, the components may communicate with one another using any combination of wired and/or wireless communication protocols.

The data manager (102) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2-5. The data manager (102) may be implemented using other types of computing devices without departing from embodiments disclosed herein. For additional details regarding computing devices, refer to FIG. 6.

The data manager (102) may be implemented using logical devices without departing from embodiments disclosed herein. For example, the data manager (102) may include virtual machines that utilize computing resources of any number of physical computing devices to provide the functionality of the data manager (102). The data manager (102) may be implemented using other types of logical devices without departing from the embodiments disclosed herein.

In one or more embodiments, the data manager (102) may include the functionality to, or may be otherwise programmed to, perform backup orchestration services for (or on) databases (400).

In one or more embodiments, data manager records (104) include records (or entries) about the assets (e.g., the databases (400)) that the data manager (102) is protecting (i.e., performing backup services for). The records for each of the assets may include, but is not limited to, (i) one or more identifiers of the assets, (ii) the current role of the asset (e.g., primary, secondary, etc.), and (iii) any other information that is required by the data manager (102) to perform the methods described herein. Further, the data manager records (104) may include, but are not limited to, backup polices (or protection policies), that describe what assets to backup, when to back up such assets, and the type of backup (e.g., incremental or full) to generate. Further, data manager records (104) may be stored in any type volatile and/or persistent storage using any type of data structure(s).

In one or more embodiments, the agent management module (106) is a component that enables communication between the data manager (102) and agent service (202) within the host (200). The agent management module is operatively connected to agent service (202) in the host (200), described in detail below.

In one or more embodiments, the host (200) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (200) described herein and/or all, or a portion, of the methods illustrated in FIGS. 2-5. The host (200) may be implemented using other types of computing devices without departing from the embodiments disclosed herein. For additional details regarding computing devices, refer to FIG. 6.

The host (200) may be implemented using logical devices without departing from the embodiments disclosed herein. For example, the host (200) may include virtual machines that utilize computing resources of any number of physical computing devices to provide the functionality of the host (200). The host (200) may be implemented using other types of logical devices without departing from the embodiments disclosed herein.

In one or more embodiments, the host (200) may include the functionality to, or otherwise be configured to, discover assets, and to perform backup jobs orchestrated by the data manager (102) to copy data in the databases (400) to the backup storage system (300). The host (200) may include the functionality to perform all, or a portion of, the methods discussed in FIGS. 2-5. The host (200) may include other and/or additional functionalities without departing from embodiments disclosed herein.

In one or more embodiments, agent service (202) may be a physical or logical component of the host that provides a communication bridge between the data manager (102) and the agent (206) and further is used to locally manage the various agents on the host (200). Agent service (202) is operatively connected to the agent management module (106) (described above), as well as agent service records (204) and the agent (206).

In one or more embodiments, agent service records (204) include records (or entries) about the assets (e.g., the databases (400)) that the agent (206) has discovered. The records for each of the assets may include, but is not limited to, (i) one or more identifiers of the asset, (ii) the current role of the asset (e.g., primary, secondary, etc.), and (iii) any other information that is required by the agent service (202) to perform the methods described herein.

In one or more embodiments, the agent (206) may be a physical or logical component of the host that provides a communication bridge between the databases (400), the backup storage system (300), and the agent service (202). In addition, the agent (206) includes functionality to discovery assets and to perform backup jobs orchestrated by the data manager (102), where the backup jobs are communicated to the agent (206) via the agent service (202). In one or more embodiments, the host (200) may include multiple agents, where each agent is configured to interact with a specific type of database (e.g., a database from a specific vendor).

In one or more embodiments, the agent records (208) include records (or entries) about the assets (e.g., the databases (400)) that the agent (206) has discovered. The records for each of the assets may include, but is not limited, (i) one or more identifiers of the asset, (ii) the current role of the asset (e.g., primary, secondary, etc.), and (iii) any other information that is required by the agent (206) to perform the methods described herein.

In one or more embodiments, the backup storage system (300) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storage system (300) described herein and/or all, or a portion, of the methods illustrated in FIGS. 2-5. The backup storage system (300) may be implemented using other types of computing devices without departing from the embodiments disclosed herein. For additional details regarding computing devices, refer to FIG. 6.

The backup storage system (300) may be implemented using logical devices without departing from the embodiments disclosed herein. For example, the backup storage system (300) may include virtual machines that utilize computing resources of any number of physical computing devices to provide the functionality of the backup storage system (300). The backup storage system (300) may be implemented using other types of logical devices without departing from the embodiments disclosed herein.

In one or more embodiments, the backup storage system (300) may include the functionality to, or otherwise be configured to, store and provide data for users (not shown) of the backup storage system (300) for data protection and/or archiving purposes. The backup storage system (300) may store backup of assets (e.g., databases (400)). The backups may include full backups and/or incremental backups. Other and/or additional data may be stored in the backup storage system (300) without departing from embodiments disclosed herein. The backup storage system (300) may include other and/or additional functionalities without departing from embodiments disclosed herein.

In one or more embodiments, the system (100) includes one or more databases (400). In one embodiment, each database may represent a local repository for the organization and consolidation of various forms of information. Each database may span logically across one or more physical storage devices and/or media (not shown), which may or may not be of the same type or co-located at a same physical site. Further, information consolidated in each database may be arranged using any storage mechanism (e.g., a filesystem, a collection of tables or records, etc.). In one embodiment of the invention, each database may be implemented using persistent (i.e., non-volatile) storage. Examples of persistent storage include, but are not limited to, optical storage, magnetic storage, NAND Flash Memory, NOR Flash Memory, Magnetic Random Access Memory (MRAM), Spin Torque Magnetic RAM (ST-MRAM), Phase Change Memory (PCM), or any other storage media defined as non-volatile Storage Class Memory (SCM). Additional details about the databases (400) are provided in FIG. 1.2.

While FIG. 1.1 shows a configuration of components, other system (100) configurations may be used without departing from the scope of the technology. In addition, while the components in FIG. 1.1 are shown as distinct components, one or more of these components may be co-located on the same physical hardware without departing from the technology.

In addition, while FIG. 1.1 shows one host, the system may include multiple hosts, where each host includes a service agent and one or more agents. The technology is not limited to this configuration.

Turning now to FIG. 1.2, FIG. 1.2 shows the databases (400) in accordance with one or more embodiments of the technology. The databases are operatively connected to one or more agents (e.g., agent (206)). The databases (400) may be arranged in a high-availability configuration. In such a configuration, each database is assigned a role, e.g., primary, physical standby, logical standby. The databases may be grouped into asset groups, where each asset group includes at least two databases. Further, each asset group includes one database with a role of primary and one or more databases with a role of standby (which may be a logical standby or a physical standby). The role associated with a given database may change over time. For example, if a database with the role of primary becomes unavailable (e.g., loses network connectivity), then another database in the asset group with a role of standby is selected and assigned the role of primary.

In one or more embodiments, a database with the role of primary (e.g., Database A, 402) is the main storage location of data for the asset group. Applications (not shown) executing on a host (e.g., FIG. 1.1, 200) may read data from and write data to this database. The databases (400) include functionality to replicate (or otherwise copy) the data from the database with the role of primary to databases with the role of standby (e.g., 404B, 404C, 404D 404E).

In one embodiment of the technology, databases with the role of physical standby (e.g., 404B, 404C) are identical copies of the database with the role of primary. The contents of the databases with the role of physical standby (e.g., 404B, 404C) may be initially created from a backup of database with the role of primary (e.g., 402). Once created, the databases with the role of physical standby (e.g., 404B, 404C) may be maintained in sync with the contents of the database with the role of primary (e.g., 402) by obtaining redo logs from the database with the role of primary (e.g., 402) and then applying the redo logs to the databases with the role of physical standby (e.g., 404B, 404C).

In one embodiment of the technology, databases with the role of logical standby (e.g., 404D, 404E) include the same content as the database with the role of primary (e.g., 402); however, the structure and/or organization of the content may be different. The contents of the databases with the role of logical standby (e.g., 404D, 404E) may be initially created from a backup of database with the role of primary (e.g., 402). Once created, the databases with the role of logical standby (e.g., 404D, 404E) may be maintained in sync with the contents of the database with the role of primary (e.g., 402) by obtaining redo logs from the database with the role of primary (e.g., 402), converting the redo logs into SQL statements, and then executing the SQL statements on the contents of the databases with the role of logical standby (e.g., 404D, 404E). Unlike databases with the role of physical standby, databases with the role of logical standby may be used for both data protection and reporting.

While FIG. 1.2 shows a configuration of components, other database configurations may be used without departing from the scope of the technology.

Database Discovery Process

Figure 2:
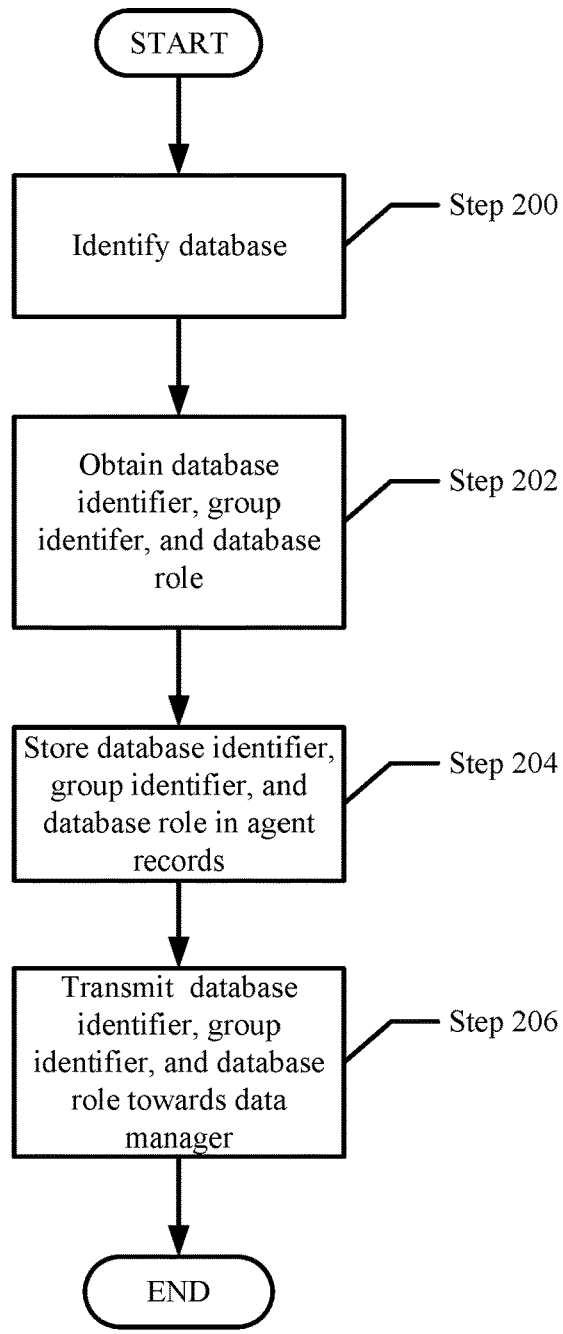
FIG. 2 shows a flowchart of a method for performing discovery in accordance with one or more embodiments of the technology.

FIG. 2 shows a flowchart of a method for discovering a database in accordance with one or more embodiments of the technology. The method shown in FIG. 2 may be performed by, for example, an agent executing on a host (e.g., FIG. 1.1, 206). Other components of the system in FIGS. 1.1-1.2 may perform all, or a portion, of the method of FIG. 2 without departing from the scope of the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

Turning to FIG. 2, in Step 200, the database is identified by the agent. The agent may use any known or later discovered method to identify the database. The database corresponds to a database (see e.g., 400, FIG. 1.2) that: (i) is newly added to the system, (ii) that was previously unavailable (or offline) and now is available (or online), or (iii) was previously discovered but its role (or another attribute) has changed, which requires (or otherwise triggers) its discovery (or re-discovery).

As discussed above, agents are specific to a given type of database; thus, different agents may perform different methods to discover different types of databases.

In Step 202, the agent obtains information about the database. Information about the database includes, but is not limited to, the database identifier, the group identifier, and the current role of the database. The information about the database may include additional and/or different information without departing from the technology.

The database identifier corresponds to an alpha, numeric, or alpha-numeric string that is used to identify the database. The database identifier may be generated (or otherwise derived) from information associated with the database. For example, the various attributes of the database may be obtained, and then a hash function may be applied to these attributes in order to generate the database identifier. Other methods for generating the database identifier may be used without departing from the technology.

The group identifier (also referred to as an asset group identifier) corresponds to an alpha, numeric, or alpha-numeric string that is used to identify the asset group (see e.g., FIG. 1.2) to which the database belongs. In certain scenarios, the group identifier may not be obtained from the database; rather, the group identifier may be generated by the agent, the agent service, and/or the data manager.

In scenarios in which the database is part of a high-availability configuration, the database may be associated with a role of primary, physical standby, or logical standby (see e.g., FIG. 1.2). In such scenarios, the role currently associated with the discovered database may be stored with the database and, during discovery, the role of the database may be obtained.

Continuing with the discussion of FIG. 2, in Step 204, the agent stores the information obtained in Step 202 in the agent records (FIG. 1.1, 208).

In Step 206, the agent transmits the information in Step 202 towards the data manager (FIG. 1.1, 102). In one embodiment, the agent transmits the database information to the agent service (see e.g., 202 in FIG. 1.1). Upon receipt of the database information, the agent service may store a copy of this information and then transmit this information to the data manager (see e.g., 102 in FIG. 1.1) via the agent management module (106, FIG. 1.1).

The method shown in FIG. 2 may be performed continuously in order to track the addition and removal (or unavailability) of database in the system along with changes to the roles of the databases within the system.

The information that is obtained in the discovery process is used to enable the role-based backup methods described in FIGS. 3.1-5.

The data manager many manage the data protection of multiple asset groups and each of the asset groups may be protected using any combination of the methods described herein.

Scheduling Backups on the Primary Database of the Asset Group

Traditionally, databases are each protected as individual entities and the related backup policies specify specific databases to back-up, (e.g., perform a full backup of Database A every 24 hours and perform an incremental backup of database A every 2 hours).

In addition to ensuring that the data in a database is protected (i.e., there is a backup copy of the data), users often want to ensure that their data is readily accessible. To achieve this goal, high-availability configurations (see e.g., FIG. 1.2) may be implemented. While this approach enables access to the data, e.g., when a database with a role of primary becomes unavailable, a database with a role of physical standby is promoted to the role of primary thereby enabling a user to continue to have access to their data. While this approach enables the user to continue to have access to their data, because the traditional approach to backing up the databases is based on specifying specific databases, when the role of a database changes (e.g., as outlined in the above scenario), then the backup policies are no longer effective, e.g., because they specify a database that has become unavailable.

Traditional approaches to address the above potential gap in backup protection are to backup multiple databases in a given asset group; however, this leads to increased load on the database and the backup storage system as well as and duplication of data (i.e., there will be multiple backup copies) in the backup storage system. Moreover, unless all databases in the asset group are backed up, there are still scenarios in which the backup policies will be attempting to backup a database that is unavailable.

To address the aforementioned issues with the traditional approaches, embodiments of the technology focus on a role-based backup policy (i.e., the policy does not specify a given database but rather specifies a database with a role of primary). In this manner, the data in the asset group is continued to be protected even when there is a role switch.

FIGS. 3.1-3.3 show flowcharts of a method for scheduling backups on the primary database of the group in accordance with one or more embodiments of the technology. The method shown in FIGS. 3.1-3.3 may be performed by, for example, the data manager (102). Other components of the system in FIGS. 1.1-1.2 may perform all, or a portion, of the method of FIGS. 3.1-3.3 without departing from the scope of the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

Referring to FIG. 3.1, FIG. 3.1 shows a method for ensuring that full backups are conducted on the primary database. This methodology is performed by the data manager (FIG. 1.1, 102).

Turning to FIG. 3.1, in Step 300, a backup request to back up a database with the role of primary for an asset group is received by the data manager. As discussed above, the data manager maintains backup policies for asset groups, where the backup policies specify the asset group, the role of the database to backup, the type of backup (e.g., full or incremental (or partial)), and the frequency of the backups. In addition, the data manager includes functionality to track the backup policies and to initiate backups (via backup requests) based on the backup policies.

In Step 302, a determination is made about whether or not the backup request received by the data manager is for a full backup. If the backup request is for a full backup, the method proceeds to Step 304; if the backup request is not for a full backup (i.e., it is a request for an incremental backup), the method proceeds to Step 310.

In Step 304, the data manager identifies which database in the asset group currently has the role of primary. The identification in Step 304 is based on the information for the asset group that is maintained in the data manager records. As discussed above, the agents (e.g., 206 in FIG. 1.1) obtains database information, which is ultimately propagated to the data manager and stored in the data manager records. Thus, the identification in Step 304 uses the group identifier (which is included in the request in Step 300) to perform a look-up in the data manager records to identify all databases associated with the asset group, and then identify the specific database that is associated with the role of primary.

In Step 306, a backup is scheduled on the specific database identified in Step 304.

In Step 308, a backup request for a full backup on the identified database is issued to the agent by the data manager. More specifically, the data manager issues the backup request to the appropriate agent service (i.e., to the agent service on the host that is executing the agent that will ultimately service the backup request). The agent service subsequently sends the backup request to the appropriate agent. The agent then performs the process shown in FIG. 3.2.

Returning to the discussion of Step 302, if the backup request is not for a full backup (i.e., it is a request for an incremental backup), then in Step 310, the data manager identifies which database in the asset group currently has the role of primary. Step 310 is performed in the same or substantially the same manner as Step 304.

In Step 312, the database in the asset group from which the last full backup was taken is identified. In one embodiment, when a backup of a database in an asset group is successfully performed, the information the database on which the backup was performed is tracked. Thus, for a given asset group, the data manager records may specify all backups performed on the databases in the asset group and, for each backup, specify the specific database that was backed up and the type of backup (e.g., full or incremental). Thus, the identification in Step 312 may involve searching the list of backups performed on the databases in the asset group, identifying the last successful full backup, and determining on which database the last successful full backup was performed.

In Step 314, a determination is made about whether the databases identified in Steps 310 and 312 are the same database. In other words, the data manager is checking whether the database currently associated with the role of primary in the data manager records for the asset group is the same database which the last successful full backup was taken. If the identified databases are the same, the method proceeds to Step 316; if the identified databases are not the same, the method proceeds to Step 306.

In Step 316, a non-full backup (e.g., an incremental backup) is scheduled on the database identified in Step 310. Once the non-full backup is scheduled, the method proceeds to Step 308.

Referring now to FIG. 3.2, FIG. 3.2 shows a method for processing the scheduled backup request by the agent. This method is performed by the agent (FIG. 1.1, 206). The method shown in FIG. 3.2 occurs after Step 308.

Turning to FIG. 3.2, in Step 318, a backup request to backup a specific database is received by the agent.

In Step 320, the role of the database is obtained from agent records by the agent. As discussed above, the agent is continuously performing the method shown in FIG. 2 and, as such, it has the most up-to-date information about the databases in the asset group. Thus, while this information is ultimately propagated to the data manager, due to the dynamic nature of the high-availability configuration, the information in the data manager records may be "stale" (i.e., not up-to-date).

In Step 322, a determination is made about the role of the database (i.e., the role of the database specified in the backup request). If the database role obtained from agent records indicates that the database has the role of primary, the method proceeds to Step 324; otherwise, the method proceeds to Step 326.

In Step 324, the backup process is initiated on database identified in Step 322. After the backup is successfully completed, the information about the successful backup is propagated to the data manager (via the agent service). The initiation of the backup process may include the agent instructing the database to start a backup operation to copy the data from the database to the backup storage system.

Returning to Step 322, if the database role obtained from agent records indicates that the database does not have the role of primary, then in Step 326, an error notification is issued to the data manager (via the agent service). Because the agent identified that the specified database does not currently have the role of primary, the backup cannot be initiated on the database.

Referring now to FIG. 3.3, FIG. 3.3 shows a method for responding to the error message generated in Step 326 in FIG. 3.2. This method is performed by the data manager (FIG. 1.1, 102).

Turning to FIG. 3.3, in Step 328, an error notification is received by the data manager that specifies there has been a role change for the identified database in the asset group (i.e., the database identified in Step 304 or 310 in the method shown in FIG. 3.1) and that the backup on the specified database was not performed.

In Step 330, a discovery process is initiated by the data manager on all databases in the asset group. In this embodiment, the data manager is searching to identify a database in the asset group with the role of primary so that a backup request may be scheduled. Step 330 includes instruction to the agent (via the agent services) to perform discovery (see e.g., FIG. 2) on the asset group to obtain the most up-to-date information on members of the asset group (i.e., which databases belong to the asset group) and the role of each of these databases.

In Step 332, a determination is made about whether the discovery process initiated by the data manager has been completed. The determination in Step 332 is based on receiving a confirmation from the discovery on the asset group has been completed. If the discovery process is complete, the method proceeds to Step 304 in FIG. 3.1; otherwise, the method proceeds to Step 334.

In Step 334, the data manager waits until the discovery process is complete, incrementally checking for progress. To check if the process is complete, the method returns to Step 332.

Scheduling Backups on the Secondary Database of the Asset Group

The approach in FIGS. 4.1-4.3 also addresses the problem outlined above with respect to FIGS. 3.1-3.3; however, in the embodiment shown in FIGS. 4.1-4.3 the backup is performed on a database with the role of standby (which may be physical or logical). Further, because a given asset group can have any number of databases with the role of standby, this embodiment also addresses how a database with the role of standby is selected from the set of databases with the role of standby.

FIGS. 4.1-4.3 show flowcharts of a method for scheduling backups on the standby database of the group in accordance with one or more embodiments of the technology. The method shown in FIGS. 4.1-4.3 may be performed by, for example, the data manager (102) and the agent (206) as shown in FIG. 1.1. Other components of the system in FIGS. 1.1-1.2 may perform all, or a portion, of the method of FIGS. 4.1-4.3 without departing from the scope of the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

Referring to FIG. 4.1, FIG. 4.1 shows a method for ensuring that full backups are conducted on the primary database. This methodology is performed by the data manager (FIG. 1.1, 102).

Turning to FIG. 4.1, in Step 400, a backup request to back up a database with the role of standby for an asset group is received by the data manager. As discussed above, the data manager maintains backup policies for asset groups, where the backup policies specify the asset group, the role of the database to backup, the type of backup (e.g., full or incremental), and the frequency of the backups. In addition, the data manager includes functionality to track the backup policies and to initiate backups based on the backup policies.

In Step 402, a determination is made about whether or not the backup request received by the data manager is for a full backup. If the backup request is for a full backup, the method proceeds to Step 404; if the backup request is not for a full backup (i.e., it is a request for an incremental backup), the method proceeds to Step 410.

In Step 404, the data manager identifies which database in the asset group currently has the role of standby and has the highest preference. The identification in Step 404 is based on the information for the asset group that is maintained in the data manager records. As discussed above, the agents (e.g., 206 in FIG. 1.1) obtain database information, which is ultimately propagated to the data manager and stored in the data manager records. Thus, the identification in Step 404 uses the group identifier (which is included in the request in Step 400) to perform a look-up in the data manager records to identify all databases associated with the asset group and then identify the specific database that is associated with the role of standby. Once all of the databases in the asset group associated with the role of standby are identified, the data manager determines the preference (or ranking) associated with each of the identified databases and then selects the database with the highest preference.

The preference associated with each of the databases with the role of standby may be set by a user, automatically by the data manager using a heuristic, using another method, or using any combination thereof.

In Step 406, a backup is scheduled on the specific database identified in Step 404.

In Step 408, a backup request for a full backup on the identified database is issued to the agent by the data manager. More specifically, the data manager issues the backup request to the appropriate agent service (i.e., to the agent service on the host that is executing the agent that will ultimately service the backup request). The agent service subsequently sends the backup request to the appropriate agent. The agent then performs the process shown in FIG. 4.2.

Returning to the discussion of Step 402, if the backup request is not for a full backup (i.e., it is a request for an incremental backup), then in Step 410, the database in the asset group from which the last full backup was taken is identified. In one embodiment, when a backup of a database in an asset group is successfully performed, the information the database on which the backup was performed is tracked. Thus, for a given asset group, the data manager records may specify all backups performed on the databases in the asset group and, for each backup, specify the specific database that was backed up and the type of backup (e.g., full or incremental). Thus, the identification in Step 410 may involve searching the list of backups performed on the databases in the asset group, identifying the last successful full backup, and determining on which database the last successful full backup was performed.

In Step 412, a determination is made about whether the database identified in Step 410 has the role of standby. If the identified database has the role of standby, then the method proceeds to Step 414; if the identified databases are not the same, the method proceeds to Step 406.

In Step 414, a non-full backup (e.g., an incremental backup) is scheduled on the database identified in Step 410. Once the non-full backup is scheduled, the method proceeds to Step 408.

Referring now to FIG. 4.2, FIG. 4.2 shows a method for processing the scheduled backup request by the agent. This method is performed by the agent (FIG. 1.1, 206). The method shown in FIG. 4.2 occurs after Step 408.

Turning to FIG. 4.2, in Step 418, a backup request to backup a specific database is received by the agent.

In Step 420, the role of the database is obtained from agent records by the agent. As discussed above, the agent in continuously performing the method shown in FIG. 2 and, as such, it has the most up-to-date information about the databases in the asset group. Thus, while this information is ultimately propagated to the data manager, due to the dynamic nature of the high-availability configuration, the information in the data manager records may be "stale" (i.e., not up-to-date).

In Step 422, a determination is made about the role of the database (i.e., the role of the database specified in the backup request). If the database role obtained from agent records indicates that the database has the role of standby and is available (i.e., the database is online), the method proceeds to Step 424; otherwise, the method proceeds to Step 426.

In Step 424, the backup process is initiated on the standby database identified in Step 422. After the backup is successfully completed, the information about the successful backup is propagated to the data manager (via the agent service). The initiation of the backup process may include the agent instructing the database to start a backup operation to copy the data from the database to the backup storage system.

Returning to Step 422, if the database role obtained from agent records indicates that the database does not have the role of standby or is unavailable, then in Step 426, an error notification is issued to the data manager (via the agent service). Because the agent identified that the specified database does not currently have the role of standby and/or that the database is unavailable, the backup cannot be initiated on the database.

Referring now to FIG. 4.3, FIG. 4.3 shows a method for responding to the error message generated in Step 426 in FIG. 4.2. This method is performed by the data manager (FIG. 1.1, 102).

In Step 428, an error notification is received by the data manager that specifies there has been a role change of the identified database (i.e., the database identified in Step 404 or 410 as shown in the method of FIG. 4.1) in the asset group and/or that the identified database is unavailable and, as such, that the backup on the specified database was not performed.

In Step 430, a determination is made about whether or not there are any other databases with the role of standby in the asset group. More specifically, because an asset group may include more than one standby database, the data manager attempts to perform a backup on another database with the role of standby in the asset group.

Continuing with the discussion of FIG. 4.3, if there are standby databases available (i.e., databases with the role of standby that have not been processed), the method proceeds to 404 in FIG. 4.1. The overall process in FIGS. 4.1-4.3 may continue until a database with the role of standby is backed up or it is determined that there are no databases with the role of standby that are available to backup.

In one embodiment, when the method proceeds to Step 404 via Step 430, the identification of the database with the role of standby includes determining the database with of the role of standby that has the highest preference that is available and for which an attempt to backup during the instant backup window has not been attempted. For example, consider a scenario in which the database preferences from highest to lowest are: database A, database B, and database C. Further, assume that a first attempt was made to backup database A, and that attempt failed because database A now has a role of primary. In response, the data manager may select database B to be backed up. If the attempt to backup database B is unsuccessful because database B is unavailable, then the data manager may select database C to be backed up.

Though not shown in FIGS. 4.1-4.3, if attempts to backup a database with the role of standby ultimately fails for an asset group, then the data manager may trigger the method shown in FIG. 2 to discover databases that have the role of standby in the asset group. Once these databases are identified, they are each assigned a preference and then the method shown in FIGS. 4.1-4.3 may be reattempted.

Enforcing Full Backups when there is a Role Change

As discussed above, the aforementioned embodiments in FIGS. 3.1-4.3 utilize role-based backup policies to effectively and efficiently backup databases that are part of high-availability configurations. However, when utilizing role-based backups where the role associated with a given database may change, there may be scenarios in which an incremental backup is scheduled to be performed on a particular database (e.g., database A that has a role of primary, see e.g., FIG. 3.1) but this database was only recently assigned this role, e.g., the role was assigned after the last backup was performed for the asset group, but prior to this receipt of a subsequently backup request for the asset group. In these scenarios, while an incremental backup may be generated, it may be possible to improve the resource utilization of the system (and minimize performance impacts) if a full backup is generated.

FIG. 5 shows a flowchart of a method for enforcing backups when the role of the database changes in accordance with one or more embodiments of the technology. The method shown in FIG. 5 may be performed by, for example, the data manager (FIG. 1.1, 102). Other components of the system in FIGS. 1.1-1.2 may perform all, or a portion, of the method of FIG. 5 without departing from the scope of the invention.

All or a portion of the method shown may be performed by one or more components of the system. While the various Steps in this flowchart are presented and described sequentially, one of ordinary skill in the relevant art will appreciate that some or all of the Steps may be executed in different orders, combined, or omitted, and some or all Steps may be executed in parallel.

Referring to FIG. 5, FIG. 5 shows a method for ensuring that full backups are enforced after a role switch. This methodology is performed by the data manager (FIG. 1.1, 102).

Turning to FIG. 5, in Step 500, the data manager (FIG. 1.1, 102) receives a backup request for an asset group. The backup request specifies the asset group and the specific database role required on which to conduct the backup (e.g., primary or standby).

In Step 502, the data manager (FIG. 1.1, 102) identifies which database in the asset group is currently using either the primary or the standby role. If the database role is primary, then the identification may be performed in a manner that is the same or substantially similar to Step 304 in FIG. 3.1. If the database role is standby, then the identification may be performed in a manner that is the same or substantially similar to Step 404 in FIG. 4.4.

In Step 504, a determination is made about whether or not the role of the identified database has changed since the backup was performed on the asset group. In one embodiment, when a backup of a database in an asset group is successfully performed, the information about the database on which the backup was performed is tracked along a timestamp indicating when the backup was obtained. This information may be tracked in data manager records, which may track all backups performed on the databases in the asset group. In addition, the data manager maintains a role history for the databases in the asset group, which specifies the current role of each database and at least a time stamp of when the database was most recently assigned this role. Thus, the determination in Step 504 may involve comparing the time stamp of when the database was most recently assigned this role (TS-R) with the timestamp of the last successfully backup (TS-B) on the asset group. If TS-R>TS-B, then there was a role change since the last successful backup. If there has been a role change since the last backup, the method proceeds to Step 506; if there has not been a role change since the last backup, the method proceeds to Step 508.

In Step 506, a determination is made about whether or not the role of the database is currently identified as the primary database of the asset group. If the role is primary, the method proceeds to Step 306 in FIG. 3.1 to schedule a full backup on the database with the role of primary; if the role is not primary, the method proceeds to Step 406 in FIG. 4.1 to schedule a full backup on the database with the role of standby.

If there has not been a role change since the last backup, then in Step 508, a determination is made about whether or not the role of the database is currently identified as the primary database of the asset group. If the role is primary, the method proceeds to Step 302 in FIG. 3.1; if the role is not primary, the method proceeds to Step 402 in FIG. 4.1.

Example

The following describes a non-limiting example of the method shown in FIG. 5.

Consider a scenario in which the asset group includes two databases-database A and database B. Further, assume that the backup policy for the asset group specifies to perform backups on the database with the role of primary as follows: (i) full backup is obtained every Sunday and (ii) an incremental backup is obtained every 24 hours Monday through Saturday.

On Sunday, a full backup is performed on database A, as it has the role of primary. On Monday, an incremental backup is performed on database A, as it has the role of primary. On Tuesday, database B assumes the role of primary and because there was a role change, a full backup is performed on database B (as opposed to an incremental backup). On Wednesday, an incremental backup is performed on database B, as it has the role of primary. On Thursday, database A re-assumes the role of primary and because there was a role change, a full backup is performed on database A (as opposed to an incremental backup).

If the method shown in FIG. 5 was not implemented, then on Thursday, an incremental backup would be performed relative to the last backup that was performed on Monday. In this case, "delta" between the current state of database A (i.e., the state on Thursday) and the last backup of database A (i.e., the incremental back up Monday). Further, because the backup of database A is an incremental backup, the backup storage system would need to maintain the following backups for database A—Full Backup (Sunday), Incremental Backup (Monday), Incremental Backup (Thursday)—in order to enable recovery of database A to its state on Thursday.

In contrast, by implementing the method shown in FIG. 5, the system would not need to expend resources to determine the "delta" and the backup storage system would only need to store Full Backup (Thursday) and not Full Backup (Sunday), Incremental Backup (Monday), Incremental Backup (Thursday). Moreover, once the full backup for Thursday is complete, the backup storage system may delete Full Backup (Sunday) and Incremental Backup (Monday) along with any related recovery logs, thereby saving/reclaiming space on the backup storage system.

End of Example

Figure 6:
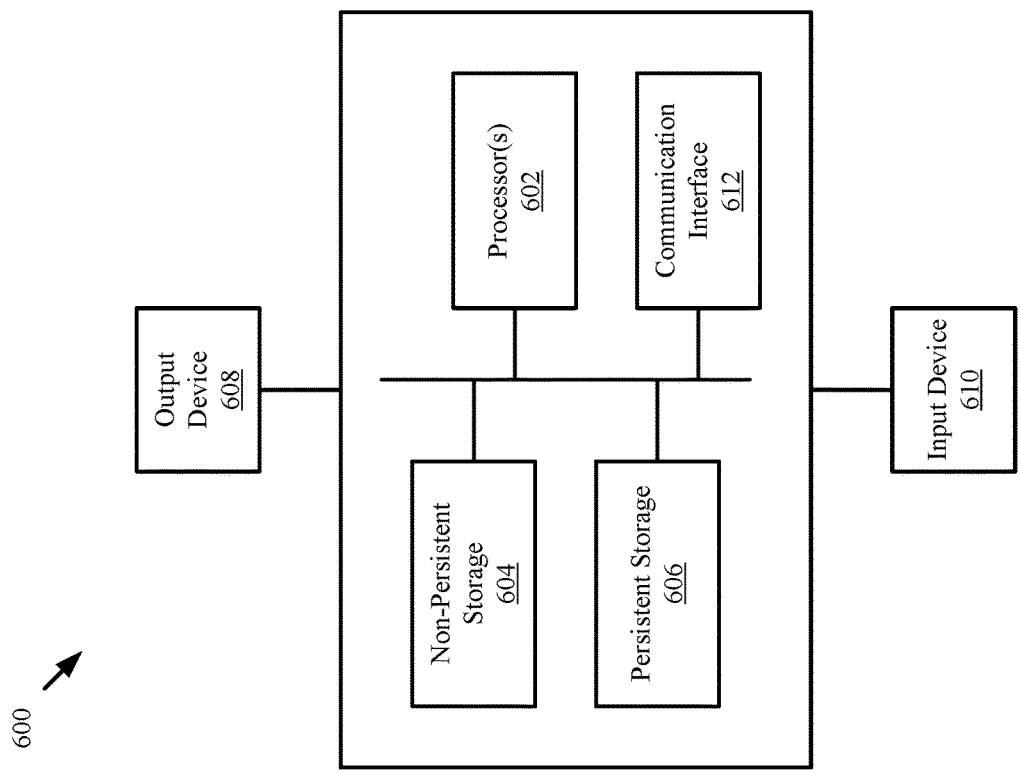
FIG. 6 shows a computing system in accordance with one or more embodiments of the technology.

As discussed above, embodiments described herein may be implemented using computing devices. FIG. 6 shows a diagram of a computing device in accordance with one or more embodiments disclosed. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one or more embodiments, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one or more embodiments, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

The problems discussed above should be understood as being examples of problems solved by embodiments described herein, and the scope of the embodiments should not be limited to solving the same/similar problems. The disclosed technology is broadly applicable to address a range of problems beyond those discussed herein.

One or more embodiments of the technology may be implemented using instructions executed by one or more processors of a computing device. Further, such instructions may correspond to computer readable instructions that are stored on one or more non-transitory computer readable mediums.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as B to C or D to E. As used herein, the aforementioned labeling means that the element may include any number of items, and does not require that the element include the same number of elements as any other item labeled as B to C or D to E. For example, a data structure may include a first element labeled as B and a second element labeled as C. This labeling convention means that the data structure may include any number of the elements. A second data structure, also labeled as B to C or D to E, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for backing up databases, the method comprising:
    identifying, by an agent executing on a host, a physical database (PD) of a plurality of PDs, wherein the PD has a role of primary and a second PD of the plurality of PDs has a role of physical standby;
    obtaining, by the agent, information associated with the PD, wherein the agent stores the information in an agent record on the host;
    transmitting, by the agent, the information to a data manager using an agent management module, wherein the agent and the plurality of PDs are operatively connected to each other over a wide area network;
    receiving, by the data manager, a backup request for the PD using a processor, wherein the backup request specifies the role of primary and an asset group identifier for an asset group, wherein the asset group comprises the PD and the second PD;
    making, by the data manager and in response to the backup request, a first determination using the processor that the backup request further specifies a partial backup;
    identifying, by the data manager and based on the first determination, a third PD in the asset group using the information, wherein a last full backup was obtained from the third PD;
    making, by the data manager, a second determination that the PD and the third PD are the same;
    issuing, by the data manager and based on the second determination, the backup request for the PD to the agent of the host, wherein issuing the backup request for the PD comprises issuing a second backup request for the partial backup; and
    initiating, in response to the second backup request and by the agent, backing up of the PD by sending an instruction to the PD,
        wherein, based on the instruction, the PD generates and sends the partial backup to a backup storage system.

2. The method of claim 1, wherein the backup request is for the partial backup of the PD.

3. The method of claim 1, wherein the asset group comprises the plurality of PDs, wherein only one PD in the asset group has the role of primary.

4. The method of claim 3, wherein the plurality of PDs is configured in a high-availability configuration.

5. A non-transitory computer readable medium comprising computer readable program code, which when executed by a computer processor enables the computer processor to perform a method for backing up databases, the method comprising:
    identifying, by an agent executing on a host, a physical database (PD) of a plurality of PDs, wherein the PD has a role of primary and a second PD of the plurality of PDs has a role of physical standby;
    obtaining, by the agent, information associated with the PD, wherein the agent stores the information in an agent record on the host;
    transmitting, by the agent, the information to a data manager using an agent management module, wherein the agent and the plurality of PDs are operatively connected to each other over a wide area network;
    receiving, by the data manager, a backup request for the PD using a processor, wherein the backup request specifies the role of primary and an asset group identifier for an asset group, wherein the asset group comprises the PD and the second PD;
    making, by the data manager and in response to the backup request, a first determination using the processor that the backup request further specifies a partial backup;
    identifying, by the data manager and based on the first determination, a third PD in the asset group using the information, wherein a last full backup was obtained from the third PD;
    making, by the data manager, a second determination that the PD and the third PD are different;
    issuing, by the data manager and based on the second determination, the backup request for the PD to the agent of the host,
        wherein, based on the second determination, issuing the backup request for the PD comprises issuing a second backup request for a full backup; and
    initiating, in response to the second backup request and by the agent, backing up of the PD by sending an instruction to the PD.
        wherein, based on the instruction, the PD generates and sends the full backup to a backup storage system.

6. The non-transitory computer readable medium of claim 5, wherein the backup request is for the partial backup of the PD.

7. The non-transitory computer readable medium of claim 5, wherein the asset group comprises the plurality of PDs, wherein only one PD in the asset group has the role of primary.

8. The non-transitory computer readable medium of claim 7, wherein the plurality of PDs is configured in a high-availability configuration.

9. A system, comprising:
    a data manager configured to:
        receive a backup request for a physical database (PD) of a plurality of PDs using a processor, wherein the backup request specifies a role of primary and an asset group identifier for an asset group, wherein the asset group comprises the PD and a second PD of the plurality of PDs, wherein the PD has the role of primary and the second PD has a role of physical standby;
        make, in response to the backup request, a first determination using the processor that the backup request further specifies a partial backup;
        identify, based on the first determination, a third PD in the asset group using information associated with the PD, wherein a last full backup was obtained from the third PD;

make a second determination that the PD and the third PD are the same;

issue, based on the second determination, the backup request for the PD to an agent service of a host,
wherein issuing the backup request for the PD comprises issuing a second backup request for the partial backup;

the agent service configured to:
receive the second backup request;
provide the second backup request to an agent,
wherein the plurality of PDs and the agent are operatively connected to each other over a wide area network; and the agent, executing on the host, configured to:
identifying the PD;
obtaining the information, wherein the agent stores the information in an agent record on the host;
transmitting the information to the data manager using an agent management module;
initiating, in response to the second backup request, backing up of the PD by sending an instruction to the PD,
wherein, based on the instruction, the PD generates and sends the partial backup to a backup storage system.

10. The system of claim 9, wherein the asset group comprises the plurality of PDs, wherein only one PD in the asset group has the role of primary.

11. The system of claim 10, wherein the plurality of PDs is configured in a high-availability configuration.

* * * * *